United States Patent [19]
Kurpiewski et al.

[11] Patent Number: 4,780,487
[45] Date of Patent: Oct. 25, 1988

[54] RADIATION CURABLE COATING COMPOSITIONS

[76] Inventors: Thomas Kurpiewski, 231 Wallace St., Erie, Pa. 16507; Richard E. Heinze, 3020 McKee Rd., Erie, Pa. 16506

[21] Appl. No.: 926,922
[22] Filed: Oct. 22, 1986
[51] Int. Cl.⁴ ............ C08F 2/50; C08F 220/58; C08F 299/06
[52] U.S. Cl. ........................ 522/93; 522/8; 522/96; 525/440; 525/455; 525/920; 526/301
[58] Field of Search .............. 522/90, 96, 93; 525/440, 455, 920

[56] References Cited

U.S. PATENT DOCUMENTS

| | | | |
|---|---|---|---|
| 4,239,866 | 12/1980 | Reitel | 522/93 |
| 4,295,909 | 10/1981 | Baccei | 522/96 |
| 4,446,286 | 5/1984 | Kolycheck | 525/455 |
| 4,525,258 | 6/1985 | Watanabe | 522/14 |
| 4,533,446 | 8/1985 | Conway | 522/13 |

OTHER PUBLICATIONS

Vorrier, S.I.R. Printing Ink for use on Flexible Films, 2/13/85.

*Primary Examiner*—Melvyn I. Marquis
*Assistant Examiner*—David Buttner

[57] ABSTRACT

Radiation curable coating compositions of reduced gloss are obtained by an admixture of (A) about 10 to 90% by weight of a polydiene-based acrylourethane oligomer comprised of the reaction product of a curable lactone modified acrylate or methacrylate and an isocyanate functional urethane and (B) about 10 to 90% by weight of a standard acrylourethane oligomer.

13 Claims, No Drawings

RADIATION CURABLE COATING COMPOSITIONS

This invention relates to radiation-curable compositions. More particularly, the invention relates to radiation curable compositions for improved wear and stain-resistant coatings with reduced gloss.

The need to reduce solvent emissions and to conserve energy in chemical processes, such as in the paint, coating and ink industries, has resulted in an acceleration of the development of 100 percent reactive systems, that is, substantially all of the components, excluding non-reactive materials such as fillers and pigments, react during curing to become an integral part of the cured film or coating. Such systems generally produce significantly less organic emissions and cure with less energy consumption as compared to coating and ink lacquers which contain significant amounts of volatile inert organic solvents.

Typically, radiation-curable compositions are composed of various reactive components which cure by polymerization through free radical or ionic mechanisms. Each component is designed to perform a specific function in both the uncured composition and the cured film. The components include, (1), a reactive low-to-medium weight polymer, generally referred to as an oligomer, which imparts primary performance characteristics to the cured film; (2), monofunctional and polyfunctional reactive monomers which can contribute to the degree of crosslinking required in the cured film and otherwise function as reactive diluent to adjust the viscosity of the formulation to a level suitable for application; and, (3), various non-reactive, specialty components such as filler, colorants, slip agents and release agents, which are added for various end-use properties.

When properly formulated, the radiation-curable formulations are readily curable by exposure to actinic radiation or ionizing radiation in either inert or oxygen-containing atmospheres. Generally, the curing of these 100 percent reactive organic compositions results in clear films having a glossy finish. However, in many applications, clarity and high gloss may not be desirable. Uniform hiding of the substrate is very often required of the coating, and may be achieved by pigmentation. In the case of coatings to be cured by actinic irradiation, for example, ultraviolet light, addition of pigments generally adversely affects the cure process. This is due to scattering of the actinic rays before they can thorougly penetrate and effect polymerization through the depth of the applied coating. Heavily pigmented coatings are worse in this regard than formulations having relatively low pigment volume concentrations. White pigments such as titanium dioxide are particularly inhibitive of light-induced polymerization. The standard inorganic and organic pigments can also have adverse effects on the chemical and/or colloidal storage stability of radiation-curable coatings, and on their application and handling characteristics. Even where hiding is not required, such as the case of varnishes for the furniture industry, gloss level may be important. Lower gloss levels are often wanted. With conventional inert solvent-based lacquer compositions, gloss reduction can be obtained by adding a flatting agent such as silica to the coating or ink composition. Flatting, that is, gloss reduction, is effected with such conventional lacquers by evaporation of the inert solvent and shrinkage of the film during the curing cycle, which results in exposure of the flatting agent above the surface of the cured film. Because radiation-curable formulations contain little, if any, volatile organic solvents, the conventional method of gloss reduction is less effective in achieving desired levels of gloss reduction. For example, while the gloss of radiation-curable films can be reduced by adding flatting agents such as silica, an equal amount of the flatting agent based on resin solids is not as effective for reducing gloss of the energy-cured film as the same amount in a 50% solids lacquer. Further, the addition of flatting agents increases the viscosity of the formulations to such an extent that proper application viscosity cannot be maintained. The resulting undesirably high viscosities cannot be adjusted simply by increasing the volume of reactive diluent because an imbalance in the reactive oligomer-reactive diluent ratio may result in separation of the formulations into distinct resin and diluent phases and can adversely affect ultimate film properties. In addition, many flatting pigments, such as calcium stearate, zinc stearate, aluminum rosinate, talc and clay, not only increase viscosities to undesirably high levels but also exhibit a blocking effect on actinic irradiation. This phenomenon not only adversely affects ultimate film properties but also extends cure times and, in many instances, regardless of the length of exposure to actinic radiation, will not provide a satisfactory degree of cure.

It has now been discovered that a mixture of two different acrylourethane oligomers not only provides coatings of reduced gloss but also of improved stain resistance and wear. This result is surprising in that each of the different acrylourethane oligomers which are employed in the oligomer blends of the invention, when used alone, typically results in a high gloss coating; and the wear and stain resistance, especially the latter, of radiation-curable compositions which are not prepared in accordance with this invention, typically decrease as the gloss level is increased. More particularly, in accordance with the invention there are provided radiation-curable compositions having these features, reduced gloss and improved stain and wear resistance, on being coated onto an appropriate substrate comprising:

A. 10 to 90 percent by weight of at least one polydiene-based acrylourethane oligomer which comprises the reaction product of:

(i) an olefinically unsaturated compound characterized by the presence of a single moiety which is reactive with an isocyanate group, and (ii) an isocyanate-functional urethane comprising the reaction product of an excess of at least one polyisocyanate and at least one hydroxylated polymer of a conjugated diene having from 4 to 12 carbon atoms; and B. 90 to 10 percent by weight of an acrylourethane oligomer comprising the reaction product of an excess of (a) an olefinically unsaturated compound characterized by the presence of a single moiety which is reactive with an isocyanate group and (b) an isocyanate-functional urethane comprising the reaction product of an excess of polyisocyanate and a polyol selected from the group consisting of polyester, polyether, polyetherester and polycaprolactone polyols, said acrylourethane oligomer B containing no trace of hydroxylated polymer of conjugated diene having from 4 to 12 carbon atoms.

In a particularly preferred embodiment, the polydiene-based acrylourethane oligomer A comprises the reaction products of (i) a curable lactone modified acrylate or methacrylate having the structure;

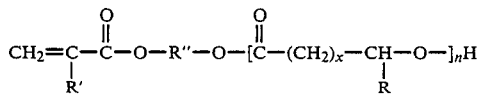

wherein
R is hydrogen or an alkyl group having from 1 to 12 carbon atoms;
R' is hydrogen or methyl;
R" is an aklylene group having from 2 to 10 carbon atoms;
x is 4 to 7; and (ii) an isocyanate-functional urethane comprising the reaction produce of an excess of polyisocyanate and a hydroxylated polymer of a conjugated diene having from 4 to 12 carbon atoms; and the other and different acrylourethane oligomer B comprises the reaction product of, (a), said lactone modified acrylate or methacrylate and, (b), an isocyanate-functional urethane comprising the reaction product of an excess of polyisocyanate and a polyol selected from the group consisting of polyester, polyether, polyetherester and polycaprolactone polyols, said acrylourethane oligomer B containing no trace of hydroxylated polymer of conjugated diene having from 4 to 12 carbon atoms.

The olefinically unsaturated compounds employed for the preparation of both oligomers A and B may be monomeric or polymeric and are characterized by the presence of a single isocyanate-reactive moiety such as an active hydrogen group. Preferably, the active hydrogen group is hydroxy. Illustrative of unsaturated addition-polymerizable monomeric organic compounds having a single isocyanate-reactive active hydrogen group are 2-hydroxypropyl acrylate, 2-hydroxyethyl methacrylate, 2-hydroxypropyl acrylate, 2-hydroxypropyl methacrylate, N-hydroxymethyl acrylamide, N-hydroxymethyl methacrylamide, diethylene glycol monoacrylate, diethylene glycol monomethacrylate, glycerine dimethacrylate, trimethylol propane dimethacrylate, reaction products of polyether glycols of acrylic or methacrylic acid and the like.

The preferred olefinically unsaturated compounds are lactone-modified acrylic or methacrylic acid esters discussed below.

The two essential components of the invention and their preparation will be discussed below under separate headings.

A. Polydiene-Based Acrylourethane Oligomer

The polydiene-based acrylourethane oligomer of the invention may be prepared by reacting the olefinically unsaturated compound with the polydiene based isocyanate functional urethane. Where the unsaturated compound is a lactone-modified acrylic or methacrylic acid ester, the oligomer may be prepared by reacting a lactone with an ester-containing acrylyl or α-substituted acrylyl groups and one or two hydroxyl groups and then reacting the resulting product with the polydiene-based isocyanate functional urethane. Alternatively, the latter oligomer can be formed by reacting simultaneously all three components, i.e. the lactone, acrylate or methacrylate and the polydiene-based isocyanate functional urethane.

Lactones employed in the preparation of oligomer A have the formula

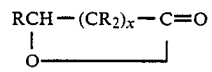

wherein R is hydrogen or an alkyl group having from 1 to 12 carbon atoms, x is from 4 to 7 and at least (x+2) R's are hydrogen. Preferred lactones are the epsilon-caprolactones wherein x is 4 and at least 6 of the R's are hydrogen with the remainder, if any, being alkyl groups. Preferably, none of these substituents contain more than 12 carbon atoms and the total number of carbon atoms in these substituents on the lactone ring does not exceed 12. Unsubstituted epsilon-caprolactone, i.e., where all the R's are hydrogen, is a derivative of 6-hydroxyhexanoic acid. Both the unsubstituted and substituted epsilon-caprolactones are available by reacting the corresponding cyclohexanone with an oxidizing agent such as peracetic acid.

Substituted epsilon-caprolactones found to be most suitable are the various epsilon-monoalkylcaprolactones wherein the alkyl groups contain from 1 to 12 carbon atoms, e.g., epsilon-methylcaprolactone, epsilon-ethylcaprolactone, epsilon-propylcaprolactone and epsilon-dodecylcaprolactone. Useful also are the epsilon-dialkylcaprolactones in which the two alkyl groups are substituted on the same or different carbon atoms, but not both on the omega carbon atoms. Also useful are the epsilon-trialkylcaprolactones wherein 2 or 3 carbon atoms in the lactone ring are substituted provided, though, the omega carbon atom is not disubstituted.

The most preferred lactone starting reactant is the epsilon-caprolactone wherein x in the formula is 4 and all the R's are hydrogen.

The acrylate or methacrylate esters lactone modified contains from 1 to 3 acrylyl or alpha-substituted acrylyl groups and one or two hydroxyl groups. Such esters are commercially available and/or can be readily synthesized. Commercially available esters include the hydroxyalkyl acrylates or hydroxyalkyl methacrylates wherein the alkyl group contains from 2 to 10 carbon atoms, preferably from 2 to 6 carbon atoms. The hydroxyalkyl acrylates and methacrylates have the following formula:

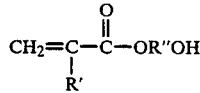

wherein R' is hydrogen or methyl and R" is a linear or a branched alkylene group having from 2 to 10 carbon atoms, preferably from 2 to 6 carbon atoms.

Examples of suitable hydroxyalkyl acrylates and methacrylates include 2-hydroxyethyl acrylate, 2-hydroxypropyl acrylate, 3-hydroxypropyl acrylate, 2-hydroxybutyl acrylate, 4-hydroxybutyl acrylate, 3-hydroxypentyl acrylate, 6-hydroxynonyl acrylate, 2-hydroxyethyl methacrylate, 2-hydroxypropyl methacrylate, 3-hydroxypropyl methacrylate, 2-hydroxybutyl methacrylate, 2-hydroxypentyl methacrylate, 5-hydroxypentyl methacrylate, 7-hydroxyheptyl methacrylate and 5-hydroxydecyl methacrylate. For UV curable coatings, the hydroxyalkyl acrylates are preferred, with hydroxyethyl acrylate being the most preferred acrylate compound. However, for in-mold coatings, the hydroxyalkyl methacrylates are preferred.

A molar ratio of the lactone to hydroxyl groups in the ester of from about 1:0.1 to about 1:5, preferably from about 1:0.3 to about 1:3 is used. Generally, a temperature of from about 25° C. to about 150° C., preferably from about 25° C. to about 100° C. is used. Times of reaction vary depending upon the temperature and catalyst used; however, generally, the reaction is allowed to proceed for from about 20 minutes to about 10 hours, preferably from about 20 minutes to about 5 hours. Suitable catalysts include sulfuric acid, para-toluene sulfonic acid, stannous octoate and butyl titanate.

The polydiene-based isocyanate functional urethane is prepared by reacting an excess of a polyisocyanate with an hydroxylated polymer of a conjugated diene having 4 to 12 carbon atoms.

The isocyanate compounds which are employed in forming the unsaturated urethane oligomers in accordance with the present invention can be any organic isocyanate compound having at least two free isocyanate groups. Included within the purview of suitable polyisocyanates are aliphatic, cycloaliphatic, and aromatic polyisocyanates, as these terms are generally interpreted in the art. Thus it will be appreciated that any of the known polyisocyanates such as alkyl and alkylene polyisocyanates, cycloalkyl and cycloalkylene polyisocyanates, aryl and arylene polyisocyanates, and combinations such as alkylene, cycloalkylene and alkylene arylene polyisocyanates, can be employed in the practice of the present invention.

Suitable polyisocyanates include, without limitation, tolylene-2,4-diisocyanate, 2,2,4-trimethylhexamethylene- 1,6-diisocyanate, hexamethylene-1,6-diisocyanate, diphenylmethane-4,4'-diisocyanate, triphenylmethane-4,4',4''-triisocyanate, polymethylene polyphenylisocyanate, m-phenylene diisocyanate, p-phenylene diisocyanate, 2,6-tolylene diisocyanate, 1,5-naphthalene diisocyanate, naphthalene-1,4-diisocyanate, diphenylene-4,4'-diisocyanate, 1,4-cyclohexylene dimethylene diisocyanate, xylylene-1,4-diisocyanate, xylylene-1,3-diisocyanate, cyclohexyl-1,4-diisocyanate, 4,4'-methylene-bis-(cyclohexyl isocyanate), 3,3'-dimethyldiphenylmethane-4,4'-diisocyanate, isophorone diisocyanate, the product obtained by reacting trimethylol propane and 2,4-tolylene diisocyanate in a ratio of 1:3, and the like. The diisocyanate compounds are preferred, with 4,4'-methylene-bis(cyclohexyl isocyanate) being especially preferred.

The hydroxylated diene polymers used to form the isocyanate function urethane employed to prepare oligomer A are all well known and include hydroxylated polymers of conjugated dienes having 4 to 12 carbon atoms such as 1,3-butadiene, isoprene, hexadiene, heptadiene, octadiene, etc. The preferred hydroxylated diene polymer is hydroxylated polybutadiene.

Oligomer A can be prepared by any of the known prior art processes. For example, the polydiene polyol can be reacted in a first cook with an excess of polyisocyanate to form an isocyanate-functional prepolymer which is then reacted with the olefinically unsaturated compound having a single isocyanate-reactive moiety. Alternatively, all the ingredients can be reacted in a single cook. Preferably, oligomer A is prepared by reacting the polyisocyanate with the olefinically unsaturated capping agent, including the preferred lactone-modified acrylic or methacrylic acid ester, prior to adding the polydiene polyol, generally employing a small excess of polyol.

B. Standard Acrylourethane Oligomer

Oligomer component B can be any of the conventional acrylourethanes prepared by reacting the olefinically unsaturated compound, preferably lactone-modified acrylate or methacrylate ester discussed above, with an isocyanate functional urethane formed by the reaction of an excess of a polyisocyanate and a polyol selected from the group consisting of polyester, polyether, polyetherester and polycaprolactone polyols. Examples of a suitable unsaturated compounds and polyisocyanates that may be used for the preparation of oligomer B have been described above. The polyester, polyether, polyetherester and polycaprolactones polyols that may be used are also well known in the art.

The polyether glycols are well known articles of commerce and are also commonly referred to as poly (alkylene oxide) polyols or polyalkylene ether glycols. They may be represented by the formula $HO(RO)_nH$, in which R is an alkylene radical and n is at least 2. The alkylene radical can be a single chain or can consist of two or more alkylene chains separated from each other by an ether oxygen atom. Preferred poly(alkylene oxide) polyols have from 1 to 9, preferably 1 to 6 carbon atoms in the alkylene chain separating each pair of oxygen atoms and have a number average molecular weight in the range from about 106 to about 4000, preferably about 106 to about 2500. Representative poly-(alkylene oxide) polyols include poly(ethylene oxide) polyols, poly(propylene oxide) polyols, poly(tetramethylene oxide) polyols, poly(nonamethylene oxide) polyols, poly(oxymethylene-ethylene oxide) polyols, poly(ethylene oxide-propylene oxide copolymer) polyols, and poly(pentaerythritol-ethylene oxide) polyols. Thus the poly(alkylene oxide)polyols will generally have from 2 to 6 hydroxyl groups, with such polyols having 2 hydroxyl groups being currently preferred. Preferred poly(alkylene oxide) polyols are poly(tetramethylene oxide) polyols, poly(propylene oxide) polyols, poly(ethylene oxide-propylene oxide) polyols, and poly(ethylene oxide) polyols, with the latter being especially preferred.

The polyester glycols are condensation polymers of an excess of a polyol such as a diol, triol and the like and an aliphatic, cycloaliphatic and aromatic acids having at least two carboxyl groups and including anhydrides of such acids.

Polycarboxylic acids which may be employed in forming the polyester polyols which are suitable for use in the present invention consist primarily of monomeric carboxylic acids having at least two carboxyl groups or their anhydrides having from 2 to 14 carbon atoms per molecule, with dicarboxylic acids or their anhydrides being currently preferred. Among such useful acids are phthalic acid, isophthalic acid, terephthalic acid, tetrahydrophthalic acid, hexahydrophthalic acid, adipic acid, sebacic acid, maleic acid, glutaric acid, chlorendic acid, tetrachlorophthalic acid, itaconic acid, trimellitic acid, tricarballylic acid, and other known polycarboxylic acids of varying types. It is currently preferred that the polyester include an aliphatic dicarboxylic acid as at least part of the acid component. Illustrative of suitable polyester polyols are poly(tetramethylene adipate)diol; poly(ethylene succinate)diol; poly(1,3-butylene sebacate)diol; poly(hexylene phthalate)diol; 1,3-butylene glycol/glycerine/adipic acid/isophthalic acid) diols and triols and the like.

Similarly, the polycaprolactone polyols are esterification polymers of polycaprolactone diols and triols with polycarboxylic acids such as discussed above.

Polyetherester polyols may be prepared by conventional esterification techniques employing conventional apparatus. Esterification is generally effected in the presence of an inert atmosphere such as nitrogen. The poly(alkylene oxide) polyol and non(polyalkylene oxide) polyol monomeric and polymeric materials are mixed in a suitable reactor and heated with agitation to a temperature from 60° C. to 100° C. or higher. The acid components are then added and heating with agitation is continued at a temperature and rate such that the water of esterification can be rapidly removed, generally by distillation. The esterification reaction is continued until the acid number is 10 or less and substantially all of the water of esterification and low-boiling impurities are removed.

Polyetherester polyols and their preparation are disclosed in detail in, for example, U.S. Pat. Nos. 4,188,455, 4,358,476 and 4,391,686, all hereby incorporated by reference.

Reactive diluent systems can be employed in the radiation curable compositions of this invention. Broadly, suitable reactive diluent systems comprise at least one unsaturated addition-polymerizable monomer which is copolymerizable with the unsaturated urethane resin upon exposure to radiation. The reactive diluent can be monofunctional or polyfunctional. A single polyfunctional diluent can be used, as can mixtures thereof; or a combination of one or more monofunctional reactive diluents and one or more polyfunctional reactive diluents can be used. Such combinations of mono- and polyfunctional reactive diluents are presently preferred. Generally, the reactive diluent system will comprise from about 10 to about 65, preferably about 25 to about 50, weight percent, based on total weight of unsaturated urethane resin and reactive diluent, of the radiation curable compositions of the invention. Particularly preferred reactive diluents are unsaturated addition-polymerizable monofunctional monomeric compounds selected from the group consisting of esters having the general formula

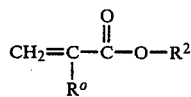

Wherein $R^o$ is hydrogen or methyl and $R^2$ is an aliphatic or cycloaliphatic, preferably alkyl or cycloalkyl group having 6 to 18, preferably 6 to 9 carbon atoms. Representative of such preferred reactive monomeric diluents, without limitation thereto, are hexyl acrylate, cyclohexyl acrylate, 2-ethylhexyl acrylate, octyl acrylate, nonyl acrylate, stearyl acrylate, and the corresponding methacrylates. Illustrative of other reactive monofunctional and polyfunctional monomeric diluents which can be employed are styrene, lactone modified esters of acrylic and methacrylic acid, methyl methacrylate, butyl acrylate, isobutyl acrylate, 2-phenoxy acrylate, 2-methoxyethyl acrylate, 2-(N,N-diethylamino)ethyl acrylate, the corresponding methacrylates, acrylonitrile, methyl acrylonitrile, methacrylamide, neopentyl glycol diacrylate, ethylene glycol diacrylate, hexylene glycol diacrylate, diethylene glycol diacrylate, trimethylol propane triacrylate, pentaerythritol di-, tri-, or tetra-acrylate, the corresponding methacrylates, vinyl pyrrolidone, and the like. At the present time, it is preferred that the reactive diluent system contain at least 50 weight percent of at least one acrylic and/or methacrylic acid ester having at least 6 carbon atoms in the non-acid moiety, with such acrylic acid esters being preferred. As noted, the reactive diluent system will comprise from about 10 to about 65, weight percent, based on total weight of unsaturated acryls urethane oligomer and reactive diluent system. Reactive diluent systems are well known to those skilled in the art of radiation curing and the selection of an appropriate diluent system in any given instance is sufficiently encompassed by such knowledge as to require no further discussion here.

A photoinitiator system will generally be employed when curing is effected by exposure to low energy radiation sources such as ultra violet light. Any of the known photoinitiators can be used within the concentration ranges previously set forth. Illustrative photoinitiators, without limitation thereto, include benzophenone, benzoin, acetophenone, benzoin methyl ether, Michler's ketone, benzoin butyl ether, xanthone, thioxanthone, propiophenone, fluorenone, carbazole, diethoxyacetophenone, the 2-, 3- and 4- methylacetophenones and methoxyacetophenones, the 2- and 3-chloroxanthones and chlorothioxanthones, 2-acetyl-4-methylphenyl acetate, 2,2'-dimethoxy-2-phenylacetophenone, benzaldehyde, fluorene, anthroquinone, triphenylamine, 3- and 4-allylacetophenone, p-diacetylbenzene, 3-chloro-2-nonylxanthone, and the like, and mixture thereof.

The invention compositions can also include pigments, fillers, wetting agents, flatting agents, flow control agents, and other additives typically present in coating compositions. In some applications, the inclusion of minor amounts of inert solvents can be advantageous. Such additive materials are well-known to those skilled in the art and do not require further elaboration herein. Also well-known are the concentrations at which such additives are used.

The coating compositions of this invention are prepared by conventional methods such as blending. The compositions can be applied to wood, metal, fabric and plastic substrates in an economical and efficient manner using conventional industrial techniques and provide smooth, uniform films which are rapidly cured to dried coatings of reduced gloss and improved stain resistance and wear.

The improved coating compositions of this invention can be applied and cured by any of the conventional known methods. Application can be by roll coating, curtain coating, airless spray, dipping or by any other procedure. The cure can be effected by exposure to any high energy source, such as ionizing radiation, and are especially suitable for curing by exposure to actinic radiation, such as ultraviolet light radiation. The equipment utilized for curing, as well as the appropriate time for curing, and the conditions under which the curing is effected are well-known to those skilled in the art of radiation curing and do not require further elaboration herein.

The invention is illustrated in greater detail by the following Examples, but these examples are not to be construed as limiting the present invention. All parts, percentages and the like are in parts by weight, unless otherwise indicated.

EXAMPLE I

A polybutadiene-based acrylourethane oligomer, designated A, is prepared as follows:

To a reaction vessel equipped with a stirrer are charged 96.1 grams of 2-hydroxy ethyl acrylate/ε-caprolactone reaction product and 55.8 grams of methylenebis (cyclohexylisocyanate). The contents of the reaction vessel are heated to 70° C. under dry air and 0.1 wt % dibutyl tin dilaurate are added. The reaction is continued until substantially all the hydroxyl groups are consumed. 168.1 Grams hydroxylated polybutadiene and 35.6 grams of propoxylated neopentyl glycol diacrylate are added to the reaction vessel and the reaction is continued until all of the isocyanate groups are consumed. The reaction vessel is cooled to room temperature. There is obtained a viscous syrup of a polybutadiene-based acrylourethane oligomer in propoxylated neopentyl glycol diacrylate reactive monomer diluent at a resin solids concentration of 90% by weight.

A standard acrylourethane oligomer designated B is prepared as follows:

To a reaction vessel equipped with a stirrer are added 1484.1 grams of 2-hydroxyethyl acrylate/ε-caprolactone reaction product and 862 grams of methylene bis (cyclohexylisocyanate). The mixture is reacted as above and to the reaction mixture are added 92 grams of polypropylene glycol, 288.1 grams hexanediol phthalate polyester diol (M.W. 1000), 222.6 hexanediol phthalate polyester diol (M.W. 500) 79.7 grams branched aliphatic polyester diol (M.W. 640) and 113 grams butanediol adipate. When the reaction is completed, the reaction vessel is cooled and acrylourethene B is obtained as a viscous syrup.

EXAMPLE II

The polybutadiene-based acrylourethane A and the standard acrylourethane B are used to prepared coating compositions as follows:

TABLE I

| COATING | A | B | C | D | E |
|---|---|---|---|---|---|
| Acrylourethane B | 52.84 | 39.63 | 26.24 | 13.31 | — |
| Acrylourethane | | 13.21 | 26.24 | 39.63 | 52.84 |
| Propoxylated Neopentyl Glycol Diacrylate | 18.21 | 18.21 | 18.21 | 18.21 | 18.21 |
| Vinylpyrrolidone | 9.19 | 9.19 | 9.19 | 9.19 | 9.19 |
| Ethoxylated trimethylol propane triacrylate | 17.92 | 17.92 | 17.92 | 17.92 | 17.92 |
| Hydroxylacylohexyl ketone | 0.92 | 0.92 | 0.92 | 0.92 | 0.92 |
| Benzophenone | 0.92 | 0.92 | 0.92 | 0.92 | 0.92 |

The compositions are coated on sheet-vinyl substrates to provide wet film thickness of 1.5 mils. The coated substrates are cured by exposure under a nitrogen atmosphere to ultraviolet radiation employing at an intensity of 200 Watts per inch at a line speed of 30 ft/min. All compositions are cured in a single pass.

The cured coatings are evaluated for 60° gloss level of scrub loss and stain resistance in accordance with standard test procedures. The results are shown in the following Table II.

TABLE II

| COATING | A | B | C | D | E |
|---|---|---|---|---|---|
| 60° Gloss: | 87 | 80 | 73 | 70 | 88 |
| % Scrub Loss: | 18% | 9% | 11% | 11% | 3% |
| Stain | 3+ | 3+ | 3 | 2+ | 1 |

The data shown that scrub resistance and stain resistance were both improved with increasing polybutadiene-based acrylourethane in the blend. In addition, the blends provided reduced gloss.

It is claimed:

1. A radiation-curable coating composition of reduced gloss relative to each component A and B along consisting essentially of:

A. about 10 to 90% by weight of a polydiene based acrylourethane oligomer comprised of the reaction product of (i) a curable lactone modified acrylate or methacrylate having the structure:

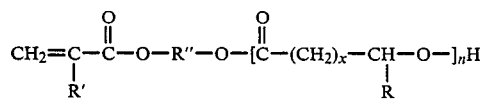

wherein
R is H or alkyl of 1 to 12 carbon atoms,
R' is H or methyl,
R'' is alkylene of 2 to 10 carbon atoms, and at least (X+2) R's are H,
x is 4 to 7, and
n is 1 to 10; and (ii) an isocyanate functional urethane comprising the reaction product of an excess of polyisocyanate and a hydroxylated polymer of a conjugated diene of 4 to 12 carbon atoms; and B. 90 to 10% by weight of an acrylourethane oligomer comprising the reaction product of (a) said lactone modified acrylate or methacrylate and (b) an isocyanate comprising the reaction product of an excess of polyisocyanate and a polyol selected from the group consisting of polyester, polyether, polyetherester and polycaprolactone polyols, said acrylourethane oligomer B containing no trace of hydroxylated polymer of conjugated diene having 4 to 12 carbon atoms.

2. A coating composition according to claim 1 wherein the weight ratio of A:B is 1 to 3:3 to 1.

3. A coating composition according to claim 1, wherein the isocyanate functional urethane comprises the reaction product of an excess of polyisocyanate and an hydroxylated polybutadiene.

4. A coating composition according to claim 3, wherein the polyisocyanate is a cycloaliphatic diisocyanate.

5. A coating compoaition according to claim 4, wherein the cycloaliphatic diisocyanate is alkylene bis (cycloalkyl isocyanate).

6. A coating composition according to claim 5, wherein the alkylene bis (cycloalkyl isocyanate) is methylene bis (cyclohexyl isocyanate).

7. A coating composition according to claim 1, wherein x in the structure of the lactone modified acrylate or methacrylate is 4 and at least six of the R's are hydrogen.

8. A coating composition according to claim 7, wherein n is 1.

9. A coating composition according to claim 7, wherein n is 2.

10. A coating composition according to claim 7, wherein the lactone modified acrylate or methacrylate is derived from epsilon-caprolactone.

11. A coating composition according to claim 1, wherein R″ is —CH$_2$—CH$_2$—.

12. A coating composition according to claim 1, wherein the lactone-modified acrylate is derived from a caprolactone and a hydroxyethyl acrylate.

13. A coating composition according to claim 12, wherein the caprolactone is ϵ-caprolactone.

* * * * *